United States Patent [19]

Fischer

[11] 4,019,420
[45] Apr. 26, 1977

[54] ANCHORING DEVICE FOR USE IN MASONRY AND LIKE STRUCTURES AND HAVING PROTECTION AGAINST DELETERIOUS INFLUENCES

[76] Inventor: Artur Fischer, Altheimer Strasse 219, D-7241 Tumlingen, Germany

[22] Filed: Oct. 30, 1974

[21] Appl. No.: 519,102

Related U.S. Application Data

[63] Continuation-in-part of Ser. No. 476,289, June 4, 1974, abandoned.

[30] Foreign Application Priority Data

| Nov. 2, 1973 | Germany | 2354825 |
| June 9, 1973 | Germany | 2329667 |

[52] U.S. Cl. ................................. 85/74; 85/77
[51] Int. Cl.² ..................................... F16B 13/06
[58] Field of Search ............. 85/74, 75, 73, 76, 84, 85/83, 77, 78, 70, 79, 1 JP; 277/209, 211, 200; 52/378, 713; 151/7

[56] References Cited

UNITED STATES PATENTS

| 1,232,274 | 7/1917 | Gay | 85/77 |
| 2,068,968 | 1/1937 | Urbanek et al. | 85/1.5 |
| 2,936,015 | 5/1960 | Rapata | 85/1.5 |
| 3,379,089 | 4/1968 | Williams | 85/73 |
| 3,444,313 | 5/1969 | Goodchild et al. | 85/70 X |
| 3,471,183 | 10/1969 | Fischer | 85/84 X |
| 3,662,644 | 5/1972 | Flesch et al. | 85/84 X |
| 3,922,831 | 12/1975 | Fischer | 85/64 X |

FOREIGN PATENTS OR APPLICATIONS

| 1,096,193 | 12/1954 | France | 85/1 JP |
| 1,124,922 | 7/1956 | France | 85/1 JP |
| 459,202 | 4/1928 | Germany | 85/1 JP |
| 886,118 | 1/1962 | United Kingdom | 85/84 |

Primary Examiner—Ramon S. Britts
Attorney, Agent, or Firm—Michael J. Striker

[57] ABSTRACT

A first element is adapted to be received and anchored in a hole of a structure. An expander member is provided for expanding at least a leading end of the first element. A second element has a first portion located in the hole and connected with the expander member, and a second portion having a part which extends outwardly from the hole and is adapted to carry an object to be mounted on the structure. An axially yieldable protective sleeve sealingly surrounds the second element intermediate the expander member and the object so as to prevent the access of corrosion-producing media to the elements.

6 Claims, 2 Drawing Figures

ANCHORING DEVICE FOR USE IN MASONRY AND LIKE STRUCTURES AND HAVING PROTECTION AGAINST DELETERIOUS INFLUENCES

CROSS-REFERENCE TO RELATED APPLICATION

This is a continuation-in-part of my copending application Ser. No. 476,289, filed June 4, 1974, now abandoned.

BACKGROUND OF THE INVENTION

This invention relates in general to an anchoring device, and in particular to an anchoring device for use in masonry and similar structures.

Anchoring devices are frequently used for anchoring in masonry structures or other structures, wherein a portion of the device—usually a portion of a screw or bolt—extends outwardly of a hole formed in the structure for the anchoring purposes, and carries adjacent to or at some spacing from the exterior surface of the structure an object, such as a cladding panel or the like. The trouble with these anchoring arrangements is that at least the portion which extends beyond the masonry or other supporting structure, i.e. the portion which is located between the supporting structure and the cladding panel, is exposed to the sometimes deleterious ambient conditions, such as moisture, corrosive gas in the atmosphere, or the like, which may cause destruction of this portion due to corrosion. Of course, it is possible to make at least the portions which are so exposed of material that is resistant to corrosion, such as specialty steels. However, these steels are much more expensive than the materials that are normally used for this purpose, and it is also much more difficult to work with them; as a result, the use of such specialty materials would substantially increase the manufacturing and selling expenses of these anchoring devices.

It is, however, important that these devices be available as inexpensively as possible, because they are used in large quantities, so that increasing in the manufacturing and selling cost of such devices can represent substantial additions to the expenses involved in a construction project, renovation project or the like.

Therefore, my copending prior application proposes to surround the exposed portion or portions with a sealing sleeve whose opposite axial ends sealingly engage the surface of the structure and the mounted object, respectively.

This provided excellent corrosion protection for the exposed portions, and also protected the interior portions of the device, i.e. those located in the bore hole, against contact with corrosion-producing media that were present exteriorly of the structure.

However, I have since found that such deleterious media are often present in the structure itself, e.g. moisture in a masonry structure. Contact of these media with the portions of the device located inwardly of the hole, and in fact even with portions located outside the hole and surrounded by the sleeve, is not prevented by my prior invention. This contact can, however, be equally as disadvantageous as contact with media present outside the structure—and is therefore highly undesirable.

SUMMARY OF THE INVENTION

Accordingly, it is an object of the present invention to provide an improved anchoring device of the type in question, which avoids the aforementioned disadvantages.

More particularly, it is an object of the present invention to provide such an improved anchoring device which is reliably protected against corrosion resulting for any and all of the reasons mentioned above, without having to utilize specialty materials.

Another object of the invention is to provide such an anchoring device which is inexpensive to produce despite the improved protection which it affords.

In keeping with the above objects, and with others which will become apparent hereafter, one feature of the invention resides in an anchoring device for use in masonry and like structures which, briefly stated, comprises a first element that is adapted to be received and anchored in a hole of a structure, an expander member for expanding at least the leading end of the first element. A second element has a first portion located in this hole and connected with the expander member, and a second portion having a part extending outwardly from the hole and adapted to carry an object to be mounted on the structure. An axially extendable yieldable protective sleeve surrounds at least the second element intermediate the expander member and the object so as to prevent the access of corrosion-producing media to these elements.

The protective sleeve may be slipped over the second element from either axial end of the latter, or it may be applied to the second element by molding or forming the sleeve around the second element. Since the expander member is located deep within the bore hole, it is frequently protected against corrosion-producing media which might for example penetrate from outside the structure only to a certain depth. In such cases, surrounding the second element alone will offer sufficient protection. However, where additional protection is required, the sleeve may also surround the expander member with a cup-shaped sleeve portion, which offers the additional advantages of also sealing the exposed end of the expander member and of preventing axial withdrawal of the sleeve in direction towards the trailing end of the device.

Making use of the present invention it is possible to produce the device entirely of relatively inexpensive and easy-to-work materials, certainly materials which are not specialty materials in the sense of the aforementioned special steels or the like, since such materials need have no particular resistance to corrosion, being protected reliably by the presence of the sleeve. On the other hand, the additional expenses involved by supplying the sleeve as a part of the device are of a very minor nature and are in no way comparable to the increases in manufacturing cost that would be required if the device were to be made wholly or in part of specially corrosion-resistant materials.

The sleeve of the novel device may be of a rubber or rubber-like elastomeric material, such as a synthetic plastic, that is capable of yielding to the requisite extent. In addition the sleeve may be constructed as a bellows to facilitate such yielding in longitudinal direction, because this latter construction in particular assures a significant yielding in axial direction and thus makes it possible to use a single sleeve for all applications, irrespective of the greater or lesser extent to which axial yielding of the sleeve may be required. Being able to use a single sleeve further reduces expenses, because it requires the manufacture of only one type of sleeve, and this reduces the manufacturing costs and at the same time reduces the stock-keeping expenses.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
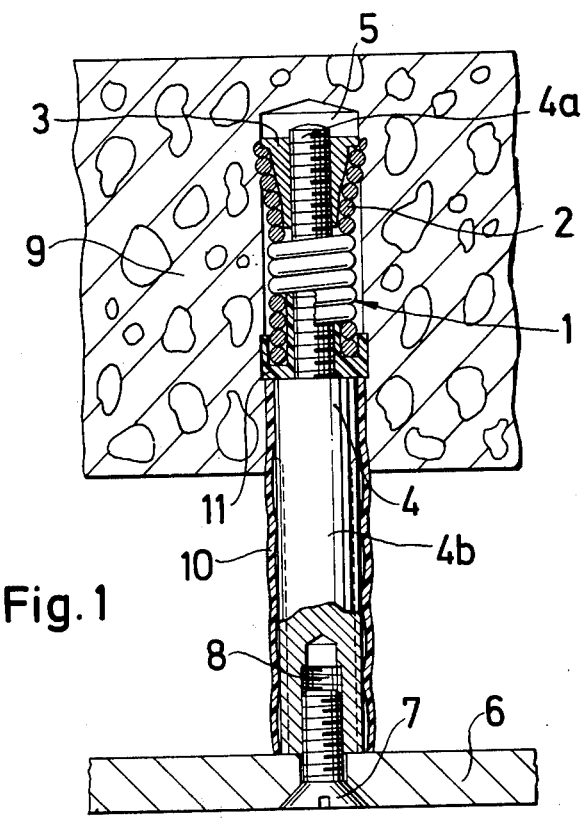
FIG. 1 is an axial section showing a device according to one embodiment of the invention anchored in a support structure.

The embodiment of FIG. 1 is generally identified with reference numeral 1 and employs a tubular expansion anchor 2 which is to be inserted into an anchoring hole 5 of a support (e.g. masonry) structure 9. An expander member 3 is located at the leading (i.e. inner) end of anchor 2 and serves to expand the latter when drawn axially into the anchor 2 by means of a shaft 4 having a reduced-diameter threaded portion 4a which is threaded into a tapped bore of the expander member 3. A portion 4b of shaft 4 extends outwardly of the hole 5 where it carries a cladding panel 6 or other object.

The mounting of the object 6 is accomplished by placing the object 6 against the outer endface of portion 4b and threading a bead screw 7 through a hole in object 6 and into a tapped bore 8 of portion 4b.

A collar-shaped ring 11 of synthetic plastic material surrounds the anchor 2—which is here in form of a block spring—at the trailing end of the anchor. A protective sleeve 10 according to the invention—yieldable in response to axial compression, as indicated by the illustrated deformations—surrounds the shaft portion 4b intermediate the ring 11 and the object 6. Its opposite axial ends bear against ring 11 and object 6, respectively, and the sleeve 10 undergoes axial compression as the screw 7 is tightened, to thereby firmly and sealingly cooperate with the ring 11 and the object 6. The outer diameter of ring 11 is somewhat greater than the outer diameter of anchor 2, so that the ring 11 serves not only to prevent rotation of the anchor 2 when member 3 is drawn in, but also seals the portion of hole 5 located forwardly of it.

The sealing effect so obtained is so good that an extension of sleeve 10 to cover the member 3 itself is only rarely required.

Figure 2:
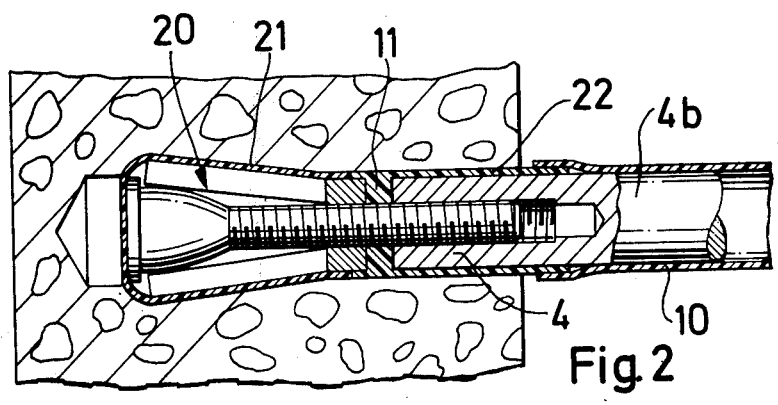
FIG. 2 is a view similar to FIG. 1, but showing a different embodiment of the invention.

If such a need does arise, then the embodiment of FIG. 2 may be used to advantage. Like reference numerals therein designate the same elements as in FIG. 1.

In FIG. 2, however, the ring 11 has a tubular extension 22 which surrounds the portion 4b over part of the axial length thereof, and which extend out of the bore hole 5 as shown. The protective sleeve is here of two discrete portions, the portion 10 which surrounds portion 4b as before but axially overlaps the extension 22, and a cap-shaped portion 21 which surrounds the expander member 20 and extends to the ring 11. This arrangement then seals the entire device, or at least all of its corrodable parts.

The overlapping of sleeve portion 10 and extension 22 prevents possible exposure of the portion 4b due to unintentional axial shifting of sleeve portion 10 when the device is being mounted.

The portions 10 and 21 may be adhesively or otherwise bonded to one another, they may be made of one piece with a suitable opening for insertion of the components to be protected, or they may be injection-molded or otherwise molded onto these components.

All corrodable parts of the device according to the present invention, may be made of inexpensive metals, and certainly are not required to be made of metals which have any particular resistance to corrosion due to moisture, chemical influence or the like. The protective sleeve may be made of any suitable synthetic plastic material, for instance polyethylene, polyvinyl chloride, or any of the other synthetic plastic materials or even natural rubber that are known in the art and have the necessary characteristics. The protective sleeve could, inter alia, also be made of synthetic plastic foam material, as long as the foam is of such type as to prevent the migration of deleterious media through it, that is of the closed-cell type or else of the open-cell type which is provided at the exterior and/or the interior of the sleeve with a non-porous skin.

It will be understood that each of the elements described above, or two or more together, may also find a useful application in other types of constructions differing from the types described above.

While the invention has been illustrated and described as embodied in an anchoring device, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that from the standpoint of prior art fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

1. An anchoring device for use in masonry and like structures, comprising a first element adapted to be received and anchored in a hole of a structure, said first element including an expander member having a threaded shaft portion and operative for expanding at least a leading end of said first element; a second element having a first turnably-actuated portion located in said hole and being formed with a tapped bore which is threadedly connected with said shaft for moving said expander member in direction generally outwardly of the hole, and a second portion having a part extending outwardly from said hole and having means adapted to carry an object to be mounted on said structure; and means for preventing access of corrosion-producing media to said elements, said preventing means being of synthetic plastic material and including an axially-yieldable tubular sleeve portion sealingly surrounding said part of said second element intermediate said expander member and said object, an annular section having a pair of end faces in respective engagement with said first and second elements, said annular section frictionally engaging said shaft portion so as to prevent undesired turning of said first element during movement of said expander member, a tubular extension section sealingly surrounding another part of said second element, and a cap-shaped section sealingly surrounding said first element, all of said sections being of one-piece with each other and preventing access of corrosion-producing media to said elements.

2. An anchoring device as defined in claim 1, wherein said expander member has an exteriorly-threaded shaft portion which is cooperatively threadedly connected with said tapped bore formed in said first portion of said second element; and wherein said annular section surrounds and frictionally engages a part of said shaft portion.

3. An anchoring device as defined in claim 1, wherein said tubular extension section and said cap-shaped section are located on and are integral with opposite sides of said annular section.

4. An anchoring device as defined in claim 1, wherein said tubular extension section, said cap-shaped section and said annular section are constituted of synthetic plastic material.

5. An anchoring device as defined in claim 1, wherein said tubular extension section has a trailing end portion which extends outwardly of said hole, and wherein said tubular sleeve portion has an enlarged section surrounding said trailing end portion in overlapping sealing relationship.

6. An anchoring device as claimed in claim 1, wherein said expander member has an exteriorly threaded shaft portion which is cooperatively threadedly connected with a tapped bore formed in said first portion of said second element, and said annular section surrounding and frictionally engaging a part of said shaft portion; and wherein said tubular extension section has a trailing end portion which extends outwardly of said hole, and wherein tubular sleeve portion has an enlarged section surrounding said trailing end portion in overlapping relationship.

* * * * *